Patented June 9, 1931

1,809,570

UNITED STATES PATENT OFFICE

ISRAEL ROSENBLUM, OF JACKSON HEIGHTS, NEW YORK

SYNTHETIC RESINOUS COMPLEX AND METHOD OF MAKING SAME

No Drawing. Application filed January 31, 1929. Serial No. 336,632.

This invention relates to fusible and soluble condensation products of a new and improved type derived from the interaction of an organic salt of a metal, a phenol, or a mixture of phenols, and an aldehyde, in the presence of a suitable solvent, preferably either a cracked or dry-distilled natural resin, such as wood rosin, which has been heated to a temperature of 260° C. or above, or a mixture of glycerol mono and di-esters prepared at lower temperatures from such dry-distilled natural resin.

It is well known that a phenol, such as phenol or one of its homologues, and an aldehyde, such as formaldehyde, will combine under certain conditions to produce a synthetic resin whose properties will depend upon the ratio of phenol to formaldehyde and upon the extent to which the condensation and polymerization have been permited to proceed. If the reaction is properly controlled, an initial or intermediate product will be obtained which is fusible and soluble in a number of organic solvents, so that such product may be used as a varnish gum. This initial fusible and soluble condensate may, upon the addition thereto of an indurating or hardening agent, such as formaldehyde in one of its forms, or hexamethylenetetramine, and upon the application of heat and pressure, be polymerized to form an infusible and insoluble product which can no longer be used as a varnish gum. If an excess of aldehyde has been used in the first reaction, e. g., more than 0.6 mol of formaldehyde to 1 mol of phenol in the case of a phenol-formaldehyde resin—such excess of aldehyde will act as a hardening agent for the fusible, soluble intermediate product, which can then be converted to the final infusible, insoluble state merely upon heating the same, preferably under pressure. Such intermediate product containing an excess of aldehyde is consequently not stable as it will be converted spontaneously into the final insoluble product on heating, and is therefore not suitable for use in varnishes.

It has already been proposed to render such intermediate products stable, i. e. permanently fusible and soluble and therefore adapted for use in varnishes, by employing an excess of phenol or by carrying out the reaction in the presence of rosin. Both of these measures, however, have serious disadvantages. Where an excess of the phenol is used, not only does the resin have the strong odor of phenol, but it is very liable to darken in color within a short time. The resin is also very acidic in character, which limits its field of application considerably. Where the condensation is carried out in the presence of gum rosin, a slight excess of formaldehyde may be used, but the rosin remains unaltered in character and tends to produce a "soft" resin mixture, i. e. one having a low melting point, and also to raise the acid number of the resin. The rosin does not react to any appreciable extent with the phenol or the formaldehyde or with the condensation product of these two compounds, the final product being a condensate of comparatively low molecular weight dissolved or suspended in the rosin. The attempt has been made to neutralize such mixture with glycerol, but only mixtures of glycerol tri-abietate with phenol-formaldehyde resin were obtained which were highly acid, had high viscosity, poor solubility in mineral spirits, and could not stand much thinning without precipitating the phenol-formaldehyde condensation product.

It is an object of the present invention to produce a permanently fusible and soluble condensation product of very high molecular weight, high melting point and comparatively low viscosity, which will be stable when heated to high temperatures and will be in all other respects stable when dissolved in varnish or lacquer solvents and consequently highly suitable for use as a varnish gum. It is also an object of this invention to produce a synthetic resin of the above-indicated character having a low acid number and a great range of solubility in organic solvents, so as to be capable of standing considerable thinning or dilution without precipitating, particularly when thinned with the mineral spirits commonly used in varnish-making. It is a further object of the invention to produce a permanently fusible synthetic soluble resinous complex which, as compared with known resins, will have a higher melting point for the same viscosity and a lower viscosity for the same melting point, and which will stand more thinning with mineral spirits as compared with phenol-formaldehyde condensates hitherto produced and having the same melting point.

I accomplish the above objects by condensing a phenol, an aldehyde and an organic salt of a metal in the presence of any suitable solvent, and preferably wood rosin or "stump rosin" which has previously been heated in retorts, preferably out of contact with air, to a temperature of about 260° C. or above. Any other similarly dry-distilled or cracked natural resin, including the fossil resins, may be used. The proportions of the reacting ingredients, particularly of the aldehyde, are so chosen that the reaction produces a permanently fusible phenol-aldehyde-organic metal salt condensation product which remains dissolved in the solvent. During this reaction the organic metal salt appears to act both as a catalyzer for the (initial) condensation whereby the soluble product is produced, and as an arrester of the final reaction which ordinarily, as above stated, converts the initial or intermediate product to the final, infusible, insoluble state. I then treat the mass so produced with a polyhydric alcohol, such as glycerol or mannitol, in such manner that a comparatively large quantity of partially esterified alcohol, (i. e. having one or more free hydroxyl groups in the molecule) is formed. In the case of glycerol, the mono and di-rosinates or abietates, in addition to the tri-esters, is produced, assuming that wood rosin has been employed. The mono and di-esters then react with the phenol-aldehyde-organic salt condensation product to form a resinous complex which, when rosin and glycerol have been employed, may be described as a mixed glyceridic ester of a phenol-aldehyde-organic salt condensate and abietic acid.

In carrying out my invention, I cause suitable proportions of a phenol, such as carbolic acid, an aldehyde, such as formaldehyde, and an organic salt of a metal, preferably a soap such as zinc rosinate or abietate, to react in the presence of a suitable solvent to form a synthetic phenol-aldehyde-organic metal salt complex or reaction product. In place of the abietate, other organic salts may be employed, such as the oleate, tungate, acetate, etc. Corresponding salts of other metals, such as lead, calcium, barium, strontium, manganese (which, like zinc and lead, is amphoteric), and cobalt, and in certain instances, salts of the alkali metals, may also be employed. As the solvent or dispersing agent, I prefer to use wood rosin obtained from stumps and previously heated or cracked at a temperature of about 260° C. or above, though similarly heated or cracked colophony or any cracked fossil resin may be used.

The initial condensation product composed of phenol, formaldehyde and zinc abietate remains dissolved in the cracked resin and cannot be rendered infusible or insoluble on heating. To this solution of the complex synthetic resin, I then add an excess of glycerol (based on the quantity of cracked resin present), which combines with the cracked resin to form a relatively large quantity of mono and di-resinate (or abietate, if cracked wood rosin was used) which have, respectively, two and one free basic hydroxyl groups. The mass is then heated up to about 250° C. to cause the glycerol mono and di-esters to combine with the initial condensation product to form a phenol-formaldehyde-zinc abietate-glycerol-mono-and-di-resinate or abietate complex of very high molecular weight, high melting point, large range of solubility in varnish solvents, and of substantially neutral character, having an acid number of about 10 or below.

Instead of forming the glycerol mono and di-resinate in the reacting mass as above described, the same may first be formed separately by treating the cracked or dry-distilled natural resin with an excess of glycerol (or other polyhydric alcohol), the mono and di-resinates, dissolved in the glycerol tri-resinate (or other completely esterified polyhydric alcohol), then being employed as a solvent for the phenol formaldehyde and organic metal salt during the initial reaction, such mono and di-resinates reacting with the initial phenol-aldehyde-organic metal salt condensate as the latter is formed, or with the aid of increase in the temperature.

The heated, cracked or dry-distilled resin employed in my process, for example dry-distilled wood rosin or gum rosin, not only has the property of reacting with glycerol at temperatures below 250° C. to form considerable quantities of the mono and di-esters, (which react with the initial phenol-aldehyde-organic salt condensate), but has also a number of other distinctive and advantageous properties. It has a lower acid number (120–130) than rosin (150–160), and is a much better dispersing agent than the ordinary untreated rosin. Its reaction with glycerol produces a low acid gum containing, as already indicated, large amounts of mono and di-esters below 250° C., such gum capable of being thinned with acetic acid esters such as ethyl acetate without precipitating from solution. This property is of great importance when my new gum is used in conjunction with nitrocellulose varnishes or lacquers which generally contain ethyl acetate as a solvent.

This property of forming the glycerol mono and di-abietate in considerable quantities is not possessed by ordinary rosin or colophony, such untreated rosin or colophony forming only traces, if any, of the mono and diesters, the tri-ester being formed almost exclusively, even when an excess of glycerol is used. This result I believe to be due to the fact that when colophony and glycerol are caused to react in known manner, there are formed what appears to be ketonic and lactonic bodies which are crystalline in nature and therefore do not form films, and which are not soluble in ethyl acetate and crystallize out therefrom. At the high temperatures heretofore employed for the esterification of colophony with glycerol these undesirable intermediate compounds were, at least in large part, destroyed, but the decomposition products, which were, to some extent at least, acidic, in character, attacked any mono and di-abietates present; while at the same time, at such high temperatures, a large part of the glycerol evaporated or was decomposed.

While I have specified glycerol, such compound being inexpensive and easily obtainable, it will be understood that other polyhydric alcohols, such as mannitol, may be employed which will react only partially with resin acids to form an ester having one or more free hydroxyl groups.

My invention will be better understood from the following examples which obviously are given by way of illustration and not by way of limitation.

*Example 1.*—1000 pounds of the mixed esters, obtained by treating dry-distilled wood or stump rosin with glycerol and containing large amounts of glycerol mono and di-esters are heated with 400 pounds of phenol, 20 pounds of zinc abietate and 200 pounds of formaldehyde (40% solution). When practically all of the formaldehyde is absorbed, the water is distilled off and the temperature is gradually raised to about 240° C. or higher. When the acid value is about 9, the reaction is complete. The reaction product is a gum of high melting point, low viscosity, having a large range of solubility (i. e. can stand thinning) in mineral spirits, will not precipitate from ethyl acetate solution on standing, and having a very high molecular weight, being chemically a complex phenol-formaldehyde-zinc abietate-glycerol mono and di-abietate compound.

In place of dry-distilled wood or stump rosin, any other similarly treated natural resin may be used, while other organic salts of zinc, such as the oleate, stearate, tungate (which are in the nature of soaps), the acetate, etc. may be used, and also the corresponding salts or soaps of other metals, although I prefer to use the salts which, like zinc abietate, are formed from an acid which is more or less resinous in character.

*Example 2.*—A mixture of 1000 pounds of dry-distilled stump rosin having an acid value of 130 or below, 300 pounds of phenol, 20 pounds of zinc abietate and 200 pounds of formaldehyde (40% solution) are heated to a temperature of about 100° C. with refluxing or under pressure. When practically all of the formaldehyde has entered into reaction, the water is distilled off and the temperature raised gradually to about 140° C. An amount of glycerol equal to 15% by weight of the dry-distilled rosin is then added and the temperature raised slowly to about 240° C. When the esterification is complete, the temperature is raised to 255° C. or somewhat higher and maintained for several hours. A complex product is formed which has an acid value of about 9.

*Example 3.*—The materials and procedure given under Example 1 are employed except that about 500 pounds of the mixed glycerol mono, di and tri-esters are substituted by 500 pounds of similarly esterified fossil gums. A product having the desirable properties of that obtained in Example 1 is produced and, in addition, is more suitable for rubbing varnishes.

*Example 4.*—A condensation complex derived from 125 pounds of phenol or cresol or a mixture of both, 10 pounds of zinc abietate and 200 pounds of formaldehyde (40% solution), and produced at a low temperature so as not to render it infusible, is run into 1000 pounds of a mixture of glycerol mono, di and tri-esters (produced as above described) which is kept at a temperature slightly above 200° C. When all of the condensation complex has been incorporated into the glycerol ester solvent, the temperature is raised to about 260° C. and kept at such value until the acid number is found to be about constant (about 10 or below).

The organic salt-phenol-aldehyde complex can be formed alone if enough of such salt (e. g. zinc abietate) is used, or if rosin of any kind is added in place of the glycerol esters described in Example 1.

Larger quantites of zinc abietate (or other organic salt) then those given in the several examples may be employed if desired; if present in large quantities in a solvent such as benzol, it will react with the phenol and formaldehyde even at room temperature.

The organic salt may be present in an amount up to aproximately 10% of the phenol, and may comprise from less than 1% to about 2% of the final resinous product.

Resins produced in accordance with my process have, in addition to the advantages mentioned above, the further advantage that when used as varnishes they withstand exposure to the weather to a remarkable degree. This property may be due to the fact that they possess a high degree of elasticity and that their solution in varnish solvents resembles more a true solution than a colloidal suspension.

While in the above examples a dry-distilled natural resin or the glycerine esters thereof are used as the solvent for the organic metal salt, phenol, and formaldehyde, or the condensation product obtained therefrom, other solvents compatible with the substances employed and with the intermediate and final products may be used.

Where in the claims I employ the term "rosin", the same is to be understood to include all forms thereof, including bleached or unbleached fresh rosin or gum rosin or colophony and the rosin obtained by leaching wood stumps and known commercially as wood or stump rosin.

Variations from the specific proportions and temperatures given above may be resorted to within the scope of the appended claims without departing from the spirit of the invention.

What is claimed is:

1. The method which comprises reacting a phenol, an aldehyde and an organic salt of a metal selected from the group consisting of the members of the alkali metal group and of the second group of the periodic system lead, manganese and cobalt in the presence of a natural resin which has been dry-distilled at a temperature of about 260° C., adding a polyhydric alcohol in quantity sufficient to form partial esters with such resin, and further heating the mass until a soluble resinous reaction product is obtained.

2. The method which comprises reacting a phenol, an aldehyde and a salt of an organic acid of resinous character and of a metal selected from the group consisting of the members of the alkali metal group and of the second group of the periodic system, lead, manganese and cobalt in the presence of a natural resin which has been dry-distilled at a temperature of about 260° C., adding a polyhydric alcohol in quantity sufficient to form partial esters with such resin, and further heating the mass until a soluble resinous reaction product is obtained.

3. The method which comprises reacting a phenol, an aldehyde, and an organic salt of a metal of the second group of the periodic system in the presence of a natural resin which has been dry-distilled at a temperature of about 260° C., adding a polyhydric alcohol in quantity sufficient to form partial esters with such resin, and further heating the mass until a soluble resinous reaction product is obtained.

4. The method which comprises reacting a phenol, an aldehyde, and a salt of a metal of the second group of the periodic system and of an acid of resinous character in the presence of a natural resin which has been dry-distilled at a temperature of about 260° C., adding a polyhydric alcohol in quantity sufficient to form partial esters with such resin, and further heating the mass until a soluble resinous reaction product is obtained.

5. The method which comprises reacting phenol, formaldehyde and zinc abietate in the presence of a natural resin which has been dry-distilled at a temperature of about 260° C., adding a polyhydric alcohol in quantity sufficient to form partial esters with such resin, and further heating the mass until a soluble reaction product is obtained.

6. The method which comprises reacting phenol, formaldehyde and zinc abietate in the presence of a natural resin which has been dry-distilled at a temperature of about 260° C., adding glycerine in quantity sufficient to form substantial amounts of glycerol mono and di-esters with such resin, and further heating the mass until a soluble resinous reaction product is obtained.

7. The method which comprises reacting phenol, formaldehyde and zinc abietate in the presence of rosin which has been dry-distilled at a temperature of about 260° C., adding glycerol in quantity sufficient to form substantial amounts of glycerol mono and di-abietates, heating the mass to a temperature below 250° C., and, after esterification of the rosin is complete, further heating the mass until a soluble resinous reaction product is obtained.

8. The method which comprises reacting phenol, formaldehyde and zinc abietate in the presence of wood rosin which has been dry-distilled at a temperature of about 260° C., adding glycerol in quantity sufficient to form substantial amounts of glycerol mono and di-abietates, heating the mass to a temperature below 250° C., and, after esterification of the rosin is complete, further heating the mass until a soluble resinous reaction product is obtained.

9. The soluble reaction product of a phenol, an aldehyde, an organic salt of a metal selected from the group consisting of the members of the alkali metal group and of the second group of the periodic system, lead, manganese and cobalt, a polyhydric alcohol and a cracked natural resin.

10. A soluble resinous reaction product comprising the mixed glyceridic ester of an acidic condensate of a phenol, an aldehyde and an organic salt of a metal selected from the group consisting of the members of the alkali metal group and of the second group of the periodic system, lead, manganese and cobalt, and a cracked natural resin.

11. A soluble resinous reaction product comprising the mixed glyceridic ester of a condensate of a phenol, an aldehyde and an organic salt of resinous character and of a metal of the second group of the periodic system, and a cracked natural resin.

12. A soluble resinous reaction product comprising the mixed glycerine ester of a phenol-formaldehyde-zinc abietate condensation product and a cracked natural resin.

13. A soluble resinous reaction product comprising the mixed glyceridic ester of a phenol-formaldehyde-zinc abietate condensation product and abietic acid which has been dry-distilled by heating to about 260° C.

14. The method which comprises reacting phenol, formaldehyde and an organic salt of zinc in the presence of a natural resin which has been dry-distilled at a temperature of about 260° C., adding a polyhydric alcohol in quantity sufficient to form partial esters with such resin, and further heating the mass until a soluble resinous reaction product is obtained.

15. The method which comprises reacting phenol, formaldehyde and a zinc soap in quantity up to approximately 10% of the amount of phenol in the presence of a natural resin which has been dry-distilled at a temperature of about 260° C., adding a polyhydric alcohol in quantity sufficient to form partial esters with such resin, and further heating the mass until a soluble resinous reaction product is obtained.

16. The method which comprises reacting phenol, formaldehyde and an organic salt of a metal selected from the group consisting of the members of the alkali metal group and of the second group of the periodic system, lead, manganese and cobalt in the presence of a natural resin which has been dry-distilled at a temperature of about 260° C., adding a polyhydric alcohol in quantity sufficient to form partial esters with such resin, and further heating the mass until a soluble resinous reaction product is obtained.

17. The method which comprises reacting phenol, formaldehyde and an organic salt of a metal of the second group of the periodic system in the presence of a natural resin which has been dry-distilled at a temperature of about 260° C., adding a polyhydric alcohol in quantity sufficient to form partial esters with such resin, and further heating the mass until a soluble resinous reaction product is obtained.

18. The method which comprises dry-distilling rosin at a temperature of approximately 260° C., treating the same with an excess of glycerol to produce substantial quantities of glycerole mono and diabietates, and heating, 1,000 parts of the mixed esters so produced with approximately 400 parts of phenol, 20 parts of zinc abietate and 200 parts of 40% formaldehyde until a resinous reaction product having a large range of solubility in mineral spirits and having an acid value below 10 is produced.

In testimony whereof I have affixed my signature.

ISRAEL ROSENBLUM.